United States Patent
Heyl et al.

(10) Patent No.: US 9,908,383 B2
(45) Date of Patent: Mar. 6, 2018

(54) AIR CONDITIONING SYSTEM FOR A MOTOR VEHICLE

(71) Applicant: VISTEON GLOBAL TECHNOLOGIES, INC., Van Buren Twp., MI (US)

(72) Inventors: Peter Heyl, Köln (DE); Dirk Schroeder, Manching (DE); Hans Hammer, Pfaffenhofen (DE); Jörg Bodewig, Kerpen (DE)

(73) Assignee: HANON SYSTEMS, Daejeon-si (KR)

( * ) Notice: Subject to any disclaimer, the term of this patent is extended or adjusted under 35 U.S.C. 154(b) by 502 days.

(21) Appl. No.: 14/029,150

(22) Filed: Sep. 17, 2013

(65) Prior Publication Data
US 2014/0075972 A1 Mar. 20, 2014

(30) Foreign Application Priority Data
Sep. 17, 2012 (DE) .................. 10 2012 108 731

(51) Int. Cl.
*B60H 1/32* (2006.01)
*B60H 1/00* (2006.01)

(52) U.S. Cl.
CPC ..... *B60H 1/00507* (2013.01); *B60H 1/00899* (2013.01); *B60H 1/00907* (2013.01); *B60H 2001/00957* (2013.01); *F01P 2060/08* (2013.01)

(58) Field of Classification Search
CPC ............. B60H 1/00507; B60H 1/00899; F01P 2060/08
See application file for complete search history.

(56) References Cited

U.S. PATENT DOCUMENTS

| | | | | |
|---|---|---|---|---|
| 4,412,432 A * | 11/1983 | Brendel | ............ | F25B 5/02 62/527 |
| 6,105,375 A | 8/2000 | Takano et al. | | |
| 6,640,889 B1 * | 11/2003 | Harte | ............ | B60H 1/00885 165/202 |
| 6,862,892 B1 * | 3/2005 | Meyer | ............ | B60H 1/00878 62/244 |

(Continued)

FOREIGN PATENT DOCUMENTS

| | | |
|---|---|---|
| DE | 4207859 A1 | 9/1993 |
| DE | 102008035089 A1 | 2/2010 |

(Continued)

*Primary Examiner* — Orlando E Aviles Bosques
(74) *Attorney, Agent, or Firm* — James D. Miller; Shumaker, Loop & Kendrick, LLP

(57) ABSTRACT

The invention relates to an air conditioning system for conditioning the air of a passenger space of a motor vehicle, the system including a refrigerant circuit with a compressor, a first heat exchanger for the heat exchange between the refrigerant and the environment and a second heat exchanger for supplying heat from the refrigerant to the air supply to be conditioned for the passenger space. The refrigerant circuit further includes, in the flow direction of the refrigerant after the compressor, a valve arrangement. The valve arrangement comprises a branch, a first valve arranged between the branch and the second heat exchanger, and a second valve arranged between the branch and the first heat exchanger. The first valve is designed with a normally open (NO) valve characteristic and the second valve with a normally closed (NC) valve characteristic.

11 Claims, 6 Drawing Sheets

(56) References Cited

U.S. PATENT DOCUMENTS

| | | | | |
|---|---|---|---|---|
| 2002/0083725 A1* | 7/2002 | Renken | ............... | F25B 13/00 |
| | | | | 62/132 |
| 2007/0214817 A1* | 9/2007 | Inaba | ............. | B60H 1/00885 |
| | | | | 62/238.6 |
| 2012/0085114 A1* | 4/2012 | Graaf | ............. | B60H 1/00278 |
| | | | | 62/238.7 |

FOREIGN PATENT DOCUMENTS

| | | |
|---|---|---|
| DE | 102010024775 A1 | 12/2011 |
| DE | 102010042127 A1 | 4/2012 |
| DE | 102010043000 A1 | 5/2012 |
| JP | H09295506 A | 11/1997 |
| JP | 2010143533 A | 7/2010 |

* cited by examiner

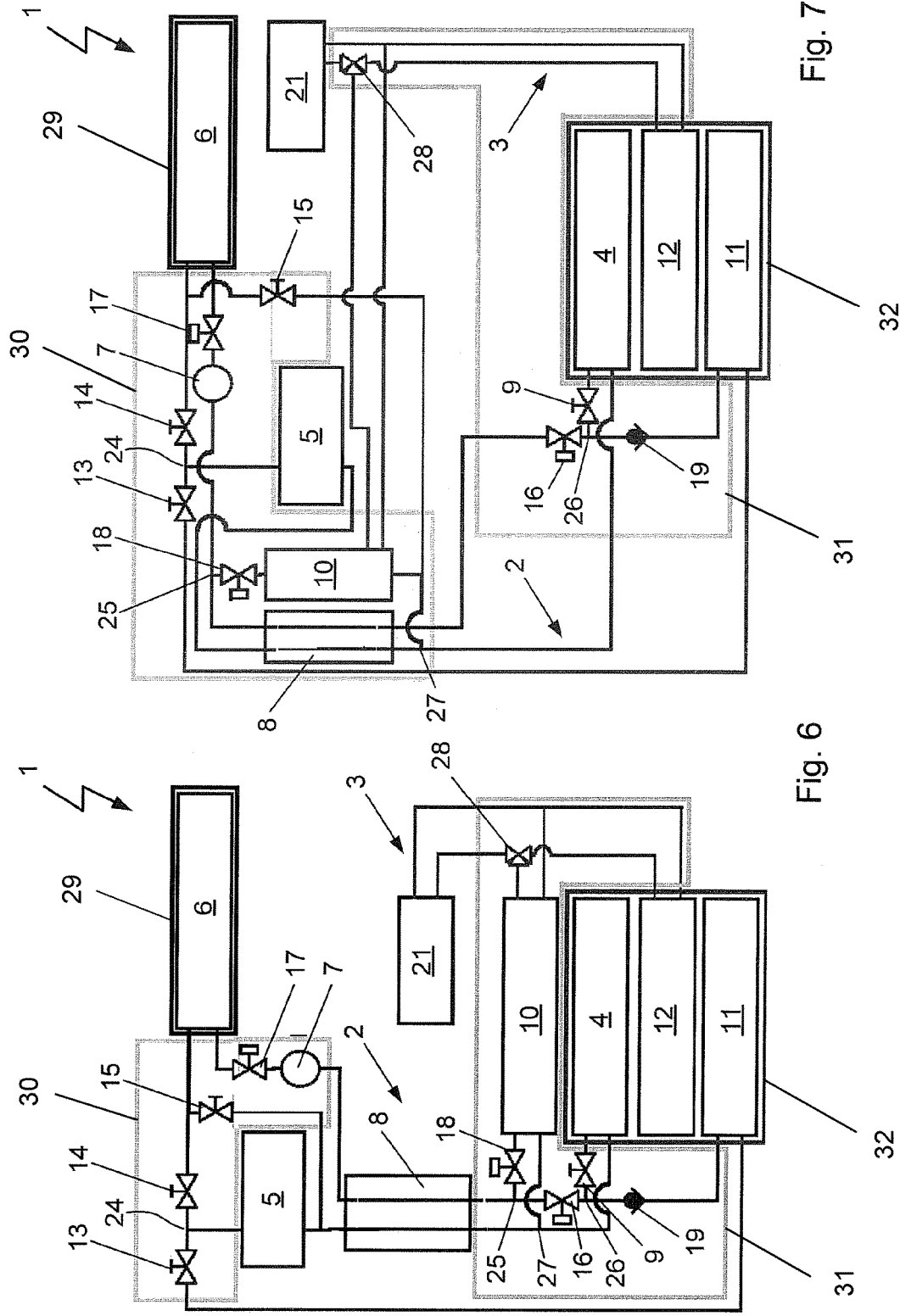

AIR CONDITIONING SYSTEM FOR A MOTOR VEHICLE

CROSS-REFERENCE TO RELATED APPLICATION

This application claims priority to German Non-Provisional Patent Application Serial No. DE 10 2012 108 731.8 filed Sep. 17, 2012, hereby incorporated herein by reference in its entirety.

FIELD OF THE INVENTION

The invention relates to an air conditioning system for conditioning the air of a passenger space of a motor vehicle with a refrigerant circuit, comprising a valve arrangement consisting of valves having different valve characteristics. The invention relates to an air conditioning system with a motor cooling circuit and a refrigerant circuit, which is formed for a combined chiller and heat pump mode as well as for a reheating mode for heating, cooling and dehumidifying the air to be conditioned for the passenger space, with an inner heat exchanger and a heat exchanger for supplying heat from the coolant to the refrigerant, wherein the components in the refrigerant circuit are arranged in such a manner that the inner heat exchanger is active or inactive in different operating modes. The invention further relates to the design of a heat exchanger of the refrigerant circuit for supplying heat from the refrigerant to the air to be conditioned for the passenger space. Moreover, the invention relates to a method for operating a refrigerant circuit of an air conditioning system when an emergency is detected.

BACKGROUND OF THE INVENTION

In the motor vehicles known from the prior art, the waste heat of the engine is used for heating the supply air for the passenger space. The waste heat is transported by means of the coolant circulated in the motor cooling circuit to the air conditioning system, and there it is transferred via the heating exchanger to the air flowing into the passenger space.

Known installations with coolant-air heat exchangers pull the heating energy from the cooling circuit of an efficient combustion engine of the vehicle drive. These installations no longer reach the required level for a comfortable heating of the passenger space if the environmental temperatures are low in order to cover the total heat demand of the passenger space. Similar statements apply to installations in vehicles with hybrid drive.

When the total heat demand of the passenger space cannot be covered using the heat from the motor cooling circuit, reheating measures are required, such as electrical resistance heaters (PTC) or fuel consuming heaters. A more efficient possibility of heating the air for the passenger space is a heat pump with air as a heat source, wherein the refrigerant circuit is used both as the sole heating device and also as the reheating measure.

The air-air heat pumps known in the art which are designed for the combined chiller and heat pump mode and also for the heating mode, absorb heat from the environmental air.

Heat pump systems in which the energies can be exchanged between the refrigerant and the air frequently are unable to simultaneously dehumidify and heat the air supplied to the vehicle. This has the consequence that the air conditioning system of a motor vehicle cannot be operated using circulating air at low environmental temperatures. In the case of an operation using circulating air, the air circulates back out of the passenger space. Due to the deficient dehumidification function, the remaining air humidity as well as the water emanating from the occupants in the form of vapor would lead to fogging of the windshields.

In conventional air conditioning systems, at environmental temperatures above 20° C., once the thermal comfort has been reached, the air supplied to the passenger space is cooled to approximately 3° C. to 10° C., dehumidified in the process, and subsequently heated with low heating power to the desired supply air temperature. Thermal comfort includes, for example, a target temperature for the passenger space of approximately 20° C. to 25° C.

Glycol-air heat pumps use the coolant of the combustion engine, which usually corresponds to a water-glycol mixture, as a heat source. In the process, heat is removed from the coolant. Consequently, the combustion engine is operated for a longer time period at low temperatures, which has a negative effect on the exhaust gas emissions and on the fuel consumption. Due to the intermittent operation of the combustion engine in hybrid vehicles, a sufficiently high coolant temperature is not reached in the case of longer trips. For this reason, the start-stop operation of the combustion engine is interrupted at low environmental temperatures. The combustion engine is not switched off.

In German Pat. Appl. Pub. No. DE 10 2010 024 775 A1, a device for air conditioning vehicles is described, which can be operated both in the heating and also in the cooling mode. The device comprises a refrigerant circuit, which comprises a thermal environmental module with a condenser for the heat transfer to the environmental air, a thermal interior module with an evaporator, and a heat register for treating supply air for the passenger space, and an expansion module with an expansion valve and with a compressor for compressing the refrigerant. In addition, the device is designed with a fluid heat exchanger, which is connected in a shiftable manner to a fluid circuit that is independent of the refrigerant circuit. The components can be switched with aid of valves so that the refrigerant can admit heat in the heating mode via the connectable fluid heat exchanger or the condenser of the ambient module, or via both, which in turn can be exchanged with the inserted condensation energy via the passenger compartment module to the passenger-compartment feed air.

SUMMARY OF THE INVENTION

The purpose of an embodiment of the present invention is to provide an air conditioning system with an air distribution system, which can be adapted to different installation spaces with simple means, in particular to a high and shallow installation space and is adaptable for use in different types of motorized vehicles. It should be possible to use the same components in each case. The intention is to minimize the costs incurred, particularly for the development, the design, the manufacture, the assembly, and the maintenance.

An advantage of an embodiment of the present invention is to further develop an air conditioning system with a refrigerant circuit for different operating modes, and to make available a method for the operation of the refrigerant circuit, which is used, as a result of the displacement of the refrigerant in the refrigerant circuit, for the protection of the vehicle occupants in the case of an emergency. An advantage is to ensure a high operating safety with minimal expense and maximum comfort for the passengers using a small installation space, and to be able to operate the air conditioning system with maximum efficiency in various operating modes.

The problem is solved according to an embodiment of the invention by an air conditioning system for conditioning the air of a passenger space of a motor vehicle with a refrigerant circuit. The refrigerant circuit comprises a compressor, a heat exchanger for the heat exchange between the refrigerant and the environment, and within a first secondary flow path, and a heat exchanger for supplying heat from the refrigerant to the air to be conditioned for the passenger space. The refrigerant circuit comprises, in addition, a valve arrangement with a branch, formed in the flow direction of the refrigerant after the compressor, a valve arranged between the branch and the heat exchanger for the heat exchange between the refrigerant and the environment, as well as a valve arranged between the branch and the heat exchanger for supplying heat from the refrigerant to the air to be conditioned for the passenger space.

According to an embodiment of the invention, the valve arranged between the branch and the heat exchanger for supplying heat from the refrigerant to the air to be conditioned for the passenger space has a NO valve characteristic, and the valve arranged between the branch and the heat exchanger for the heat exchange between the refrigerant and the environment has an NC valve characteristic. The refrigerant circuit is, in an embodiment of the invention, is advantageously designed for a combined chiller and heat pump mode as well as for a reheating mode.

According to an alternative embodiment of the invention, the valve arranged between the branch and the heat exchanger for supplying heat from the refrigerant to the air to be conditioned for the passenger space is designed with an NC valve characteristic, and the valve arranged between the branch and the heat exchanger for the heat exchange between the refrigerant and the environment is designed with an NO valve characteristic.

The valve arrangement provided in the flow direction of the refrigerant after the compressor can, in addition to the arrangement of two separate 2-2-way valves, also be designed as a combination in a 3-2-way valve.

According to another embodiment of the invention, the refrigerant circuit has an additional secondary flow path with a valve, wherein the flow path extends, starting from the connection between the valve of the valve arrangement, which is arranged in the direction of the heat exchanger for the heat exchange between the coolant and the environment, and the heat exchanger itself. The flow path extends up to the inlet into the compressor. The valves of the valve arrangement and valve of the secondary flow paths are designed in a combination preferably as a 4-2-way valve.

The problem is also solved by an air conditioning system according to an embodiment of the invention with a refrigerant circuit designed for a combined chiller and heat pump mode as well as for a reheating mode circuit which comprises a compressor, a heat exchanger for the heat exchange between the refrigerant and the environment, and a valve arranged between the compressor and the heat exchanger. Moreover, the refrigerant circuit comprises a second secondary flow path, which extends from a branch to an opening and is designed with a heat exchanger for supplying heat from a coolant of a motor cooling circuit to the refrigerant of the refrigerant circuit as well as with an upstream expansion device. The refrigerant circuit further comprises an inner heat exchanger for exchanging heat from the high-pressure side to the low-pressure side of the refrigerant circuit.

According to a design of the invention, the branch and the opening of the second secondary flow path as well as a third secondary flow path are arranged with an additional valve in such a manner that the inner heat exchanger is active in the chiller mode and inactive or active in the heat pump mode.

According to an alternative embodiment, the refrigerant circuit is designed in such a manner that the inner heat exchanger is inactive in the heat pump mode, that is to say no heat is exchanged in the inner heat exchanger.

The branch of the second secondary flow path on the high-pressure side and the opening on the low-pressure side are arranged in the flow direction of the refrigerant in the heat pump mode in each case either after the inner heat exchanger or before the inner heat exchanger. In addition, a third secondary flow path with the valve extends starting from the connection between the valve of the valve arrangement, which is arranged in the direction of the heat exchanger for the heat exchange between the refrigerant and the environment, and the heat exchanger itself, up to the inlet into the compressor. The third secondary flow path opens on the low-pressure side into the coolant line arranged between the inner heat exchanger and the compressor.

According to a further embodiment of the invention, the coolant circuit is designed in such a manner that the inner heat exchanger is active in the heat pump mode, that is to say heat is exchanged in the inner heat exchanger.

The branch of the second secondary flow path is arranged in the flow direction of the refrigerant of the valve arrangement in the heat pump mode after the inner heat exchanger at high pressure, and the opening is arranged before the inner heat exchanger at low pressure. In addition, the third secondary flow path with a valve extends starting from the connection between the valve of the valve arrangement, which is arranged in the direction of the heat exchanger for the heat exchange between the refrigerant and the environment, and the heat exchanger itself, up to the inlet into the inner heat exchanger. The third secondary flow path thus opens on the low-pressure side into the refrigerant line leading to the inner heat exchanger.

The problem is solved by means of an air conditioning device according to an embodiment of the invention for conditioning the air of a passenger space of a motor vehicle, comprising a refrigerant circuit with a heat exchanger for supplying heat from the refrigerant to the air to be conditioned for the passenger space.

According to the embodiment of the invention, the heat exchanger is designed in a single row and with a depth in the range from 10 mm to 20 mm as well as for the transmission of a power of up to 7 kW. The depth of the heat exchanger here refers to the extent of the heat exchanger in the flow direction of the air. The depth is thus obtained from the extent perpendicularly to the base area of the heat exchanger, wherein the base area denotes the area perpendicular to the flow direction of the air, that is to say the area through which the air flows into the heat exchanger or out of the heat exchanger. The depth of the heat exchanger can be 12 mm to 20 mm, and it is optimized in a manner specific to a given vehicle in the range from 10 mm to 12 mm.

According to an embodiment of the invention, the air conditioning system comprises a motor cooling circuit with a heat exchanger for supplying heat from the coolant to the air to be conditioned for the passenger space. The heat exchanger is arranged in the flow direction of the air to be conditioned for the passenger space and is in a row with the heat exchanger for supplying heat from the refrigerant to the air to be conditioned for the passenger space. The heat exchanger through which the coolant flows is arranged before the heat exchanger through which the refrigerant flows.

The heat exchangers preferably have base areas of the same dimensions. The base areas of the different heat exchangers are arranged with the same mutual orientation.

According to an embodiment of the invention, the base areas of the heat exchangers have base areas that differ from each other. The heat exchanger for supplying heat from the coolant to the air to be conditioned for the passenger space is advantageously designed with a depth in the range from 30 mm to 55 mm. Here, a depth of 30 mm to 45 mm is preferred.

The problem is solved with an air conditioning device according to the invention for conditioning the air of a passenger space of a motor vehicle, with a refrigerant circuit and a motor cooling circuit. The refrigerant circuit comprises: a compressor as well as a heat exchanger for the heat exchange between the refrigerant and the environment, with a valve on one side, and a valve arranged between the compressor and the heat exchanger; a heat exchanger for the heat exchange between the refrigerant and the air to be conditioned for the passenger space, with a valve upstream in the flow direction of the refrigerant; a receiver; a first secondary flow path with a valve as well as a heat exchanger for supplying heat from the coolant to the air to be conditioned for the passenger space; a second secondary flow path with a heat exchanger for supplying heat from a coolant of a motor cooling circuit to the refrigerant of the coolant circuit, and a valve; a third secondary flow path with a valve, wherein the flow path extends starting from the connection between the valve arranged in the direction of the heat exchanger for the heat exchange between the refrigerant and the environment, and the heat exchanger itself, up to the inlet into the compressor; and an inner heat exchanger for exchanging heat from the high-pressure side to the low-pressure side of the refrigerant circuit. The motor cooling circuit comprises a heat exchanger for the heat exchange from the coolant to the air to be supplied to the passenger space as well as a valve.

According to another embodiment of the invention, the heat exchanger for the heat exchange between the refrigerant and the environment is arranged in a front area of the motor vehicle. The valves formed around the heat exchanger for the heat exchange between the refrigerant and the environment as well as the valves of the first and of the third secondary flow path as well as the receiver are provided in the area of a wheel case of the motor vehicle. The valve positioned upstream in the flow direction of the refrigerant of the heat exchanger for the heat exchange between the refrigerant and the air to be conditioned for the passenger space, the valve of the second secondary flow path as well as the valve of the motor cooling circuit are arranged in an area of the radiator tank of the motor vehicle. The heat exchanger for the heat exchange between the refrigerant and the air to be conditioned for the passenger space of the refrigerant circuit and of the motor cooling circuit are accommodated in an air conditioning apparatus.

According to an embodiment of the invention, the heat exchanger of the second secondary flow path is arranged with the associated valve in the area of the radiator tank of the motor vehicle.

According to a further embodiment of the invention, the inner heat exchanger and the heat exchanger of the second secondary flow path are arranged with the associated valve in the area of the wheel case of the motor vehicle.

The heat exchanger for supplying heat from the coolant to the refrigerant in the second secondary flow path of the refrigerant circuit and the heat exchanger for the heat exchange from the coolant to the air to be supplied to the passenger space are advantageously connected parallel to each other in the motor cooling circuit by flow technology and they are preferably arranged so that they can each be separated from the motor cooling circuit via a valve or a three-way valve.

According to an advantageous embodiment of the invention, the products of the inner volumes and the densities of the refrigerant on the high-pressure side and the low-pressure side of the refrigerant circuit are equal.

The method according to an embodiment of the invention for operating a refrigerant circuit of an air conditioning system for conditioning the air of a passenger space of a motor vehicle, wherein the refrigerant circuit comprises a compressor, a heat exchanger for the heat exchange between the refrigerant and the environment, and a heat exchanger for supplying heat from the refrigerant to the air to be conditioned for the passenger space, comprises the following steps: detecting an emergency by means of a vehicle environment sensor system and/or a vehicle communication and switching off the compressor.

According to an embodiment of the invention, the refrigerant circuit is designed for a combined chiller and heat pump mode as well as a reheating mode, and it comprises a valve arrangement arranged in the flow direction of the refrigerant after the compressor. The valve arrangement comprises a branch, a valve arranged between the branch and the heat exchanger for the heat exchange between the refrigerant and the environment, as well as a valve arranged between the branch and the heat exchanger for supplying heat from the refrigerant to the air to be conditioned for the passenger space. The refrigerant circuit is operated advantageously in such a manner that the heat exchanger is exposed, for the heat exchange between the refrigerant and the environment, to refrigerant having a pressure that deviates from the high pressure. The method preferably comprises the following additional step: opening of the valve arranged between the branch and the heat exchanger for the heat exchange between the refrigerant and the environment, while the valve arranged between the branch and the heat exchanger for supplying heat from the refrigerant to the air to be conditioned for the passenger space is opened.

By way of the displacement of the refrigerant from the heat exchanger for supplying heat from the refrigerant to the air to be conditioned for the passenger space through the valve arrangement, that is to say through the opened valves and via the branch into the heat exchanger for the heat exchange between the refrigerant and the environment, the high pressure in the heat exchanger arranged in the supply air flow to the passenger space is reduced.

The heat exchanger for the heat exchange between the refrigerant and the environment has two connection sides for refrigerant lines, wherein, on a first connection side, the valve of the valve arrangement is arranged, and on a second connection side, an additional valve is arranged. The valve of the second connection side of the heat exchanger is advantageously opened, so that an additional volume of the refrigerant circuit is available for the displacement of refrigerant.

Additional advantages of the refrigerant circuit of the air conditioning system according to an embodiment of the invention compared to the prior art can be summarized as follows: rapid provision of hot air in the case of low environmental temperatures and cold cooling water of the motor cooling circuit; reheating mode wherein the heating power of the reheating device is lower than the refrigeration capacity of the evaporator; simple, reliable, and energetically optimal operation, in particular in the heat pump mode, including during the startup of the system, with regard to the power, efficiency and comfort to be provided; maximum useful life of the air conditioning system, in particular due to a minimization of switching processes; and minimal disturbing noises.

BRIEF DESCRIPTION OF THE DRAWINGS

Additional details, features and advantages of the invention result from the following description of embodiment examples in reference to the associated drawings. The figures show the air conditioning system with the refrigerant circuit:

FIG. 6 illustrates an air conditioning system with the refrigerant circuit as an arrangement in the motor vehicle with an inactive inner heat exchanger in the heat pump modes according to FIG. 2 as well as in the mode for dehumidifying and reheating the air according to FIG. 4; and FIG. 7 illustrates an air conditioning system with the refrigerant circuit as an arrangement in the motor vehicle with an active inner heat exchanger in the heat pump modes according to FIG. 2 as well as in the mode for dehumidifying and reheating the air according to FIG. 4.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

In FIGS. 1-5, an air conditioning system 1 for a motor vehicle with a refrigerant circuit 2 and a motor cooling circuit, or engine cooling circuit, 3 is represented in different operating modes.

Figure 1:
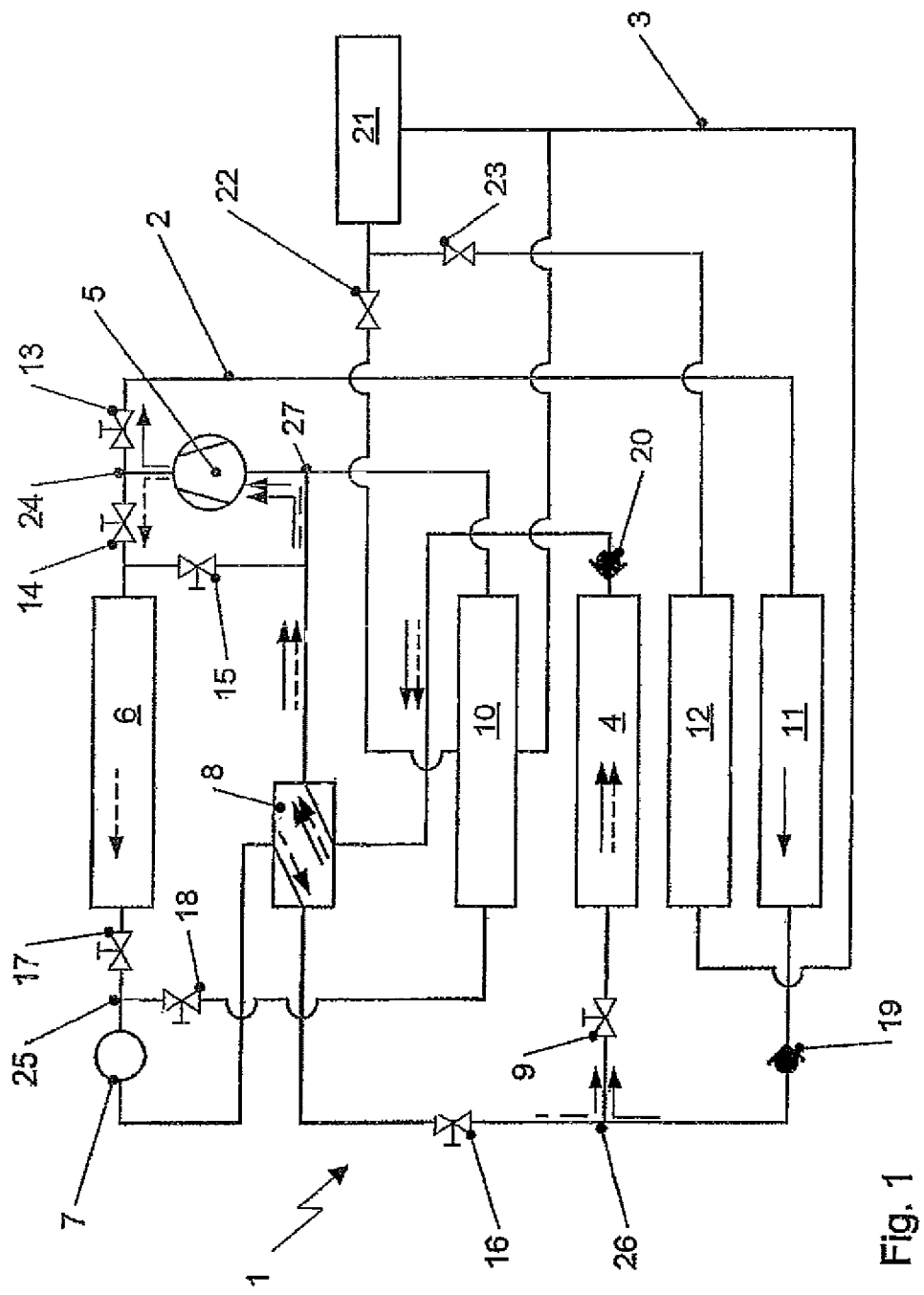
FIG. 1 illustrates an air conditioning system with the refrigerant circuit in the chiller mode as well as in the mode for dehumidifying and heating the air.

In addition to an evaporator 4, a compressor 5, a heat exchanger 6 operated as a condenser/gas cooler, a receiver 7, and an expansion valve 16, arranged one after the other in the flow direction of the refrigerant in the chiller mode, which is shown with arrows drawn with broken lines in FIG. 1. The refrigerant circuit 2 also comprises an inner heat exchanger 8. The inner heat exchanger 8 denotes a circuit-internal heat exchanger, which is used for the heat exchange between the refrigerant at high pressure and the refrigerant at low pressure. For example, on the one hand, the liquid refrigerant is further cooled after the condensation, and, on the other hand, the suction gas is overheated before the compressor 5.

A cutoff valve or check valve 19 prevents the flow of the refrigerant from the direction of the valve 16 into a heat exchanger or heat register 11. In the opposite flow direction, the cutoff valve 19 is permeable.

If the liquefaction of the refrigerant occurs at below-critical operation, for example, with the refrigerant R134a or, under certain environmental conditions with carbon dioxide, the heat exchanger 6 is referred to as a condenser. A portion of the heat exchange occurs at constant temperature. At above-critical operation, or respectively, at above-critical heat release in the heat exchanger 6, the temperature of the refrigerant decreases steadily. In this case, the heat exchanger 6 is also referred to as a gas cooler. Above-critical operation can occur under certain environmental conditions or in certain operating modes of the air conditioning system 1, for example, with the refrigerant carbon dioxide.

For the simultaneous cooling and dehumidifying as well as heating of the supply air for the passenger space, also referred to as reheating, and marked in FIG. 1 on the basis of the flow direction of the refrigerant with arrows drawn with solid lines, the refrigerant circuit 2 of the air conditioning system 1 comprises secondary paths with additional components.

At the outlet of the compressor 5, a branch 24 is formed. Between the branch 24 and the heat exchanger 6, an additional cutoff valve 14 is arranged, which is closed. A first secondary flow path extends from the branch 24 to the branch 26 at the outlet of the expansion valve 16, and, in the flow direction of the refrigerant starting from the compressor 5, it comprises an opened cutoff valve 13 as well as a heat exchanger 11, also referred to as heat register 11 and it fulfills the function of a second condenser/gas cooler.

The first secondary flow path opens between the expansion valve 16, which is closed, and a valve or evaporator valve 9 into the refrigerant circuit. After the cooling or the condensation in the heat register 11, the refrigerant expands as it flows from the valve 9 to a cutoff valve or check valve 20 and an inner heat exchanger 8 back to the compressor 5. The cutoff valve 20 is used to prevent refrigerant collection in the evaporator 4 during the operation in the reheat mode. The inner heat exchanger 8 is exposed to through-flow only on the low-pressure side and it is inactive. The air flowing over the evaporator 4 is dehumidified and/or cooled, and then heated again by the heat register 11. The heating power here is composed of the powers supplied in the evaporator 4 and in the compressor 5 to the refrigerant.

Within the motor cooling circuit 3, the coolant, preferably a water-glycol mixture, is circulated between an engine or motor 21 and a heat exchanger 12. In the heat exchanger 12, which is also referred to as a heating exchanger, the heat released by the motor 21 is transferred to the air to be supplied to the passenger space. The heat exchanger 12 is designed as a glycol-air heat exchanger.

The flow paths of the motor cooling circuit 3, which are connected in parallel, are opened or closed by means of cutoff valves 22, 23, wherein each flow path is formed with the cutoff valves 22, 23, and can thus be switched separately. In the operating mode described in FIG. 1, the cutoff valve 23 is opened. The cutoff valve 22, which has a flow path with a heat exchanger 10 for transferring heat released by the motor 21 to the evaporating refrigerant in the refrigerant circuit 2, is closed. There is no flow through the heat exchanger 10.

The air which has been suctioned through a blower, which is not shown, is led in the flow direction first via the evaporator 4, subsequently via the heating exchanger 12 and then via the heat register 11, before it flows into the passenger space. The heat exchangers 10, 12, 11 are consequently arranged in the indicated order one after the other with regard to the air to be supplied to the passenger space, and depending on the demand and the operating mode, they are switched on or off. Alternatively, the heat register 11 can also be arranged in the flow direction of the air behind the heating exchanger 12.

Figure 2:
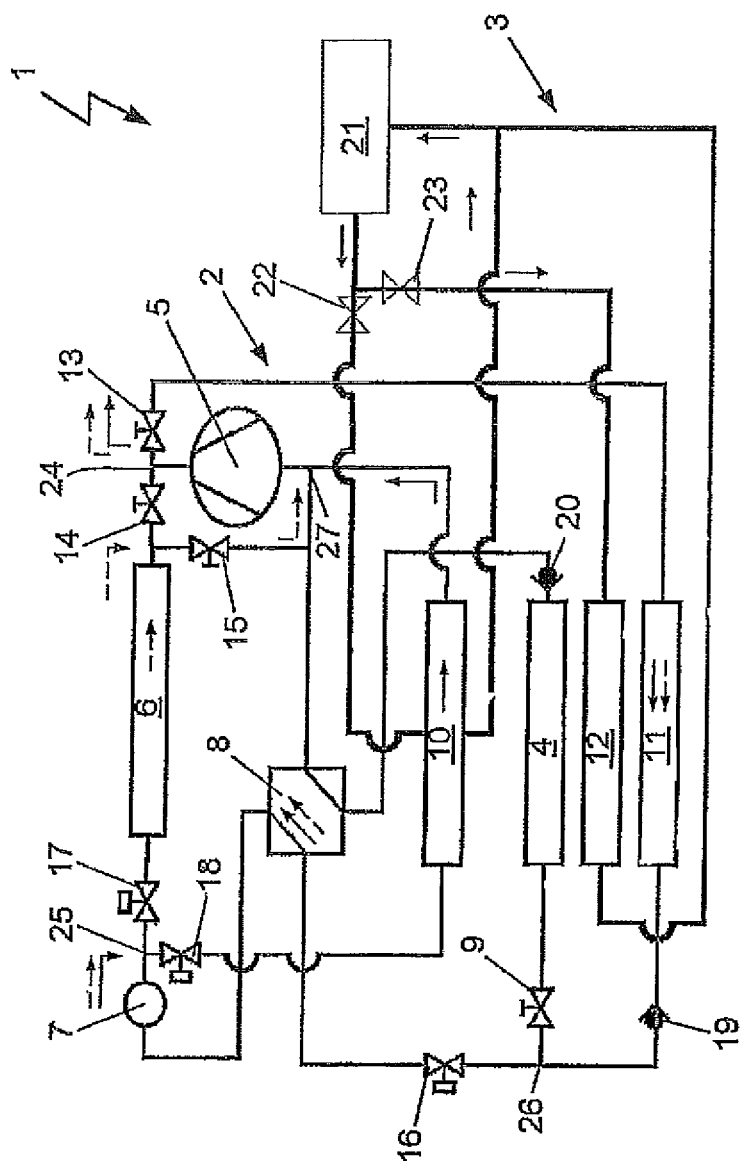
FIG. 2 illustrates an air conditioning system with the refrigerant circuit in the heat pump mode with environmental air as heat source as well as in the heat pump mode with coolant of the motor cooling circuit as heat source.

In the case of low environmental temperatures, the passenger space needs to be heated, which can be achieved by means of the air conditioning system 1 according to FIG. 2 which can be operated in the heating or heat pump mode. FIG. 2 shows the refrigerant circuit 2 in the heat pump mode with environmental air as heat source as well as with coolant of the motor cooling circuit 3 as heat source.

Besides the first secondary flow path described in relation to FIG. 1, a second secondary flow path extends from a branch 25, which is arranged between the heat exchanger 6 or an upstream valve 17 and the receiver 7, up to the opening 27 at the inlet into the compressor 5. The second secondary flow path consequently opens between the inner heat exchanger 8 and the compressor 5 into the refrigerant circuit 2, and it comprises an expansion device 18 designed as an expansion valve as well as a heat exchanger 10. The heat exchanger 10 can be exposed, on the one hand, to the through-flow of a refrigerant and, on the other hand, to the through-flow of the coolant of the motor cooling circuit 3. On the refrigerant-side, the heat exchanger 10 is operated as an evaporator, so that, depending on the operating mode, heat is transferred from the coolant to the refrigerant. The heat exchanger 10 is also referred to as a chiller.

A third secondary flow path with a cutoff valve 15 connects the section between the cutoff valve 14 and the heat exchanger 6 to the inlet of the compressor 5.

In the heat pump mode of the air conditioning system 1, the valves 9, 13, 14 are switched in such a manner that the refrigerant mass flow after the compressor 5 is led through the first secondary flow path and thus through the heat register 11 designed as a second condenser/gas cooler, as well as the valve 16. The flow direction of the refrigerant is indicated by arrows, wherein the arrows drawn with broken lines show the flow direction of the refrigerant in the heat pump mode with air as heat source and the arrows drawn with solid lines indicate the flow direction of the refrigerant in the heat pump mode with the coolant of the motor cooling circuit 3 as heat source.

The cutoff valve 13 is opened, while the cutoff valve 14 is closed. In the heat register 11, heat is released by the refrigerant to the air to be supplied to the passenger space.

The valve 9 is closed, in order to separate the evaporator 4 by flow technology from the refrigerant circuit 2. Since the inner heat exchanger 8 is exposed to flow only on one side, no heat is exchanged here. The inner heat exchanger 8 is inactive.

The section of the primary refrigerant circuit 2 extending from a branch 26 to the opening 27 is in fact not exposed to the flow of refrigerant. However, it is open so that a deposition of refrigerant and oil can occur. In order to prevent this deposition, the cutoff valve 20 is arranged in the flow direction of the refrigerant after the evaporator 4. Alternatively, the cutoff valve 20 can also be arranged after the inner heat exchanger 8.

Depending on the arrangement of the components in the motor vehicle, the inner heat exchanger 8 can also be exposed to active through-flow without the use of additional components, in particular additional valves.

In the heat pump mode with air as heat source, the refrigerant undergoes a pressure decrease entering the two-phase region, as it flows through the expansion valve 17 to a pressure level corresponding to the environmental temperature. Subsequently, in the heat exchanger 6 operated as an evaporator, heat is transferred from the environment to the refrigerant. The air conditioning system 1 absorbs the heat from the environmental air. The refrigerant mass flow is led, after exiting the heat exchanger 6, through the third secondary flow path and the opened cutoff valve 15 to the inlet of the compressor 5. The refrigerant circuit 2 is thus closed.

In the motor cooling circuit 3, the coolant is circulated between the motor 21 and the heating exchanger 12. The cutoff valve 22 is closed, while the cutoff valve 23 is opened. The coolant thus flows exclusively through the heating exchanger 12, so that the heat released at the motor 21 is transferred exclusively to the air to be supplied to the passenger space.

The heat exchanger 10 in the process is not exposed to through-flow of refrigerant or coolant. The valve 18 is closed. Any refrigerant and oil that nonetheless have collected in the case of corresponding operating conditions can be expelled by briefly opening the valve 22 and thus applying hot coolant of the motor cooling circuit 3 to the heat exchanger 10.

In the heat pump mode with the coolant of the motor cooling circuit 3 as heat source, the refrigerant, as it flows through the expansion valve 18, undergoes a pressure reduction entering the two-phase region, to a pressure level corresponding to the coolant temperature. Subsequently, in the evaporator 10, heat is transferred from the coolant circulated in the motor cooling circuit 3 to the refrigerant. The air conditioning system 1 absorbs heat from the motor cooling circuit 3. The refrigerant mass flow is suctioned from the evaporator 5 after exiting the evaporator 10. The refrigerant circuit 2 is closed.

In the motor cooling circuit 3, the coolant is circulated between the motor 21 and the evaporator 10. The cutoff valve 22 is opened. In the case of the simultaneously closed cutoff valve 23, the coolant flows exclusively through the evaporator 10, so that the heat released at the motor 21 is transferred exclusively to the evaporating refrigerant in the refrigerant circuit 2. The heating exchanger 12 is then not exposed to through-flow of coolant. Alternatively, besides the cutoff valve 22, the cutoff valve 23 can also be opened. The coolant then flows in parallel both through the evaporator 10 and also through the heating exchanger 12, so that the heat released at the motor 21 is transferred both to the refrigerant and also to the air to be supplied to the passenger space. The size and thus the power of the heat exchanger 10, 11, 12 are adapted to the respective operating mode of the air conditioning system 1.

The expansion valves 16, 17, 18 can be operated in accordance with the required filling quantity of refrigerant in the chiller and heat pump mode. In the case of a deficiency of refrigerant in the heat pump mode, the refrigerant can already have undergone a preliminary pressure reduction as it flows through the expansion valve 16. The refrigerant then has a lower density, and the filling quantity of a refrigerant in the receiver 7 is reduced.

Depending on the heat pump mode with different heat sources, the expansion valves 17, 18 are alternately closed or opened, so that either the heat exchanger 6 or the heat exchanger 10 is exposed to through-flow of refrigerant, while in each case the other heat exchanger 6, 10 is not exposed to flow. Alternatively, the two heat exchangers 6, 10 can also be exposed to flow of refrigerant, so that both the environmental air and also the coolant of the motor cooling circuit 3 can be used as heat sources.

During the operation of the air conditioning system 1, for example, when switching between the heat pump modes, or also during an idle-state of the air conditioning system 1, refrigerant can be displaced in the components of the refrigerant circuit 2, for example, into a component that is not exposed to active through-flow of refrigerant. The displacement of refrigerant can, however, lead to a deficiency of refrigerant in a subsequently set operating mode.

In order to prevent a refrigerant deficiency at the start-up of the air conditioning system 1, the cutoff valves 13, 14 have a suitable valve characteristic, and they have an NO characteristic or an NC characteristic. A valve with an NO characteristic, in the unswitched and thus unenergized state, is "open," where NO stands for "normally open." A valve with an NC characteristic, in the unswitched, unenergized state, is "closed." Here NC stands for "normally closed."

By means of the design of the valve 13 with NO characteristic and the valve 14 with NC characteristic, one prevents that, immediately after switching off the air conditioning system 1, refrigerant collects from an operation in the heat pump mode in the cold heat exchanger 6, and that, subsequently, when the air conditioning system 1 is restarted, an insufficient quantity of refrigerant is available, especially in the heat pump mode with coolant as heat source.

In addition, it is advantageous to design the valve 9 with NO characteristic, because in that case, refrigerant that has collected in the section of the refrigerant circuit 2 extending from the branch 26 to the opening 27 is suctioned in each operation mode through the compressor.

The valves 13, 14, in the represented embodiment, are designed as 2-2-way valves. The valves 13, 14 consequently each have two connections and two switching positions. Alternatively, the valves 13, 14 are also designed in a combination as a 3-2-way valve or, with the additional inclusion of the valve 15, as a 4-2-way valve, with the same valve characteristics of the valves 13, 14, 15.

In addition, the inner volumes of the fluid-carrying line sections, or the line sections exposed to refrigerant in the gas phase, and components on the high-pressure side and the low-pressure side of the refrigerant circuit 2 are adjusted as a function of the operating mode and as a function of the state of the refrigerant in such a manner that an optimal filling quantity for all operating modes is ensured.

In an emergency, that is, for example, in case of an accident or a calculated prediction of an accident by a driver assistance sensor system or a vehicle environment sensor system in connection with the vehicle communication, the compressor 5 is switched off independently of the refrigerant circuit 2 used and independently of the operating mode used. In the heat pump mode and in the case of the simultaneous configuration of a split in the flow of the refrigerant after the compressor 5, in the case of accident detection, the valve 14 is opened additionally with the valve 13 being open, in order to clearly reduce the high pressure in the heat register 11, and thus prevent exposure of the occupants to hazard due to hot high-pressure refrigerant and the refrigerant itself. Due to the opening of the valve 14, the high pressure in the first secondary flow path is decreased abruptly from the outlet of the compressor 5 through the valve 13 and the heat register 11, to the expansion valve 16, since the refrigerant into the "cold" heat exchanger 6, which, depending on the heat pump mode, is either operated as an evaporator or environmental air flows around it without function. The exposure of the occupants in the passenger space to a hazard, due to hot refrigerant that is exposed to high pressure in the heat register 11, which is arranged in the supply flow to the passenger space, is drastically reduced. Even after an accident has been prevented, the air conditioning system 1 can be restarted in a simple manner, after switching off the compressor 5 and opening of the valve 14.

In addition, in special cases, in a case of an emergency, the possibility also exists of closing the valve 15 in the third secondary flow path as a connection to the inlet of the compressor 5, in order to displace the refrigerant from the first secondary flow path exclusively into the heat exchanger 6, and avoid a displacement into the evaporator 4. The displacement of the refrigerant into the evaporator 4 is also prevented, in the case of the refrigerant circuit 2 according to FIG. 2, by the cutoff valve 20. Moreover, the expansion valve 17 can be opened, in order to make available a larger volume for the refrigerant exiting the first secondary flow path.

Figure 3:
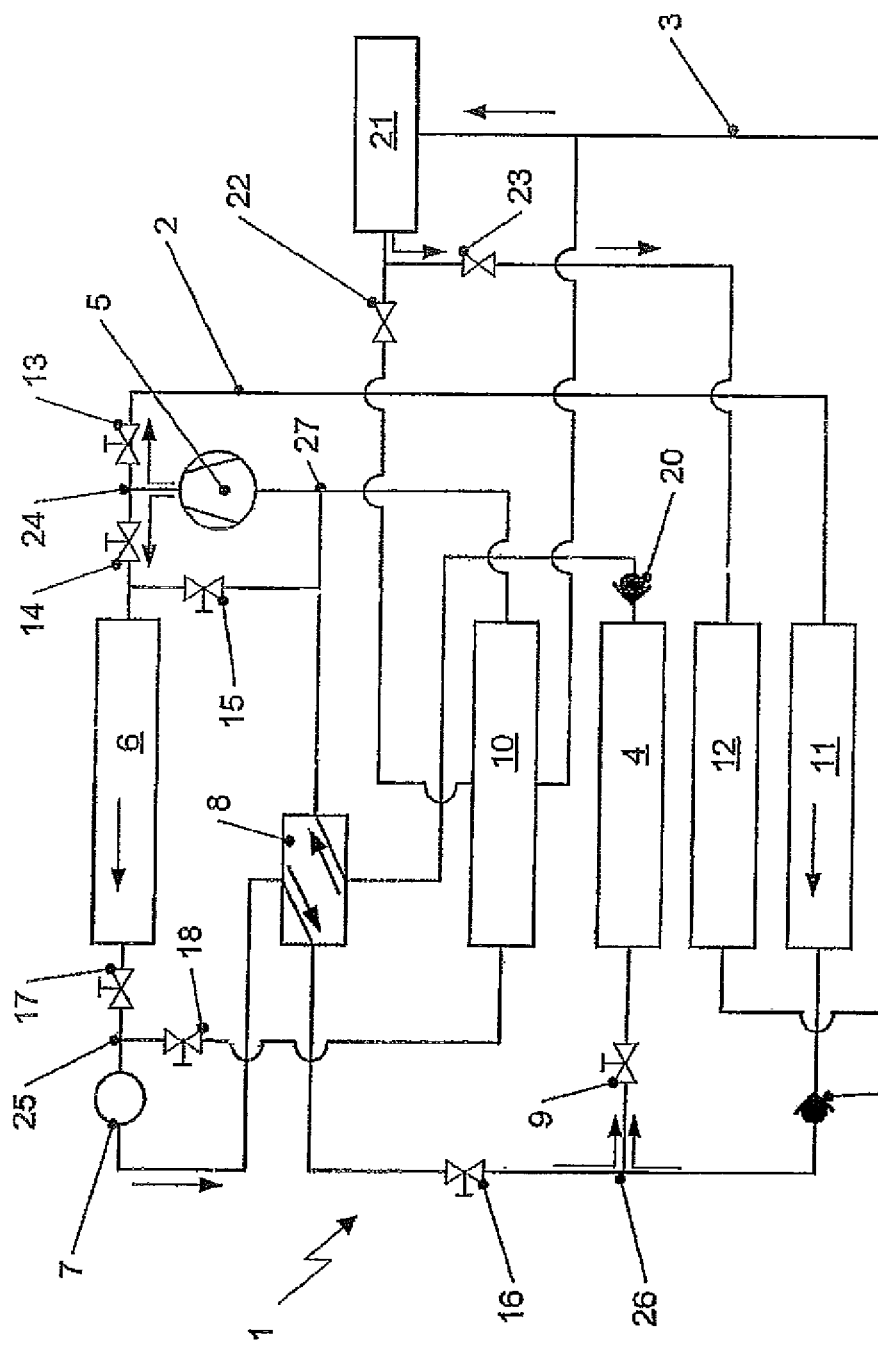
FIG. 3 illustrates an air conditioning system with the refrigerant circuit in the mode for dehumidifying and reheating the air with additional heat release to the environmental air.

FIG. 3 shows the air conditioning system 1 with the refrigerant circuit 2 in the mode for dehumidifying and reheating the air with additional heat release to the environmental air. The refrigerant mass flow compressed in the compressor 5 to a high pressure is led by means of the opened or partially opened cutoff valves 13, 14 both into the heat exchanger 6 acting as a condenser/gas cooler and also into the heat register 11. In the heat exchanger 6 and the heat register 11, the refrigerant releases heat to the air, in the heat exchanger 6 to the environmental air, and in the heat register 11 to the air to be supplied to the passenger space.

Before flowing through the evaporator 4, the two partial mass flows of refrigerant are combined and subjected to a pressure reduction. The inner heat exchanger 8 is active and it is exposed on both sides to refrigerant.

By means of the portions of the partial mass flows, or the splitting up of said flows after the compressor 5, one sets the proportion of the power supplied in the evaporator 4 and in the compressor 5 to the refrigerant as heat for reheating the air for the passenger space, which has been dehumidified and/or cooled in the evaporator 4. The remaining power is released as heat to the environment.

Figure 4:
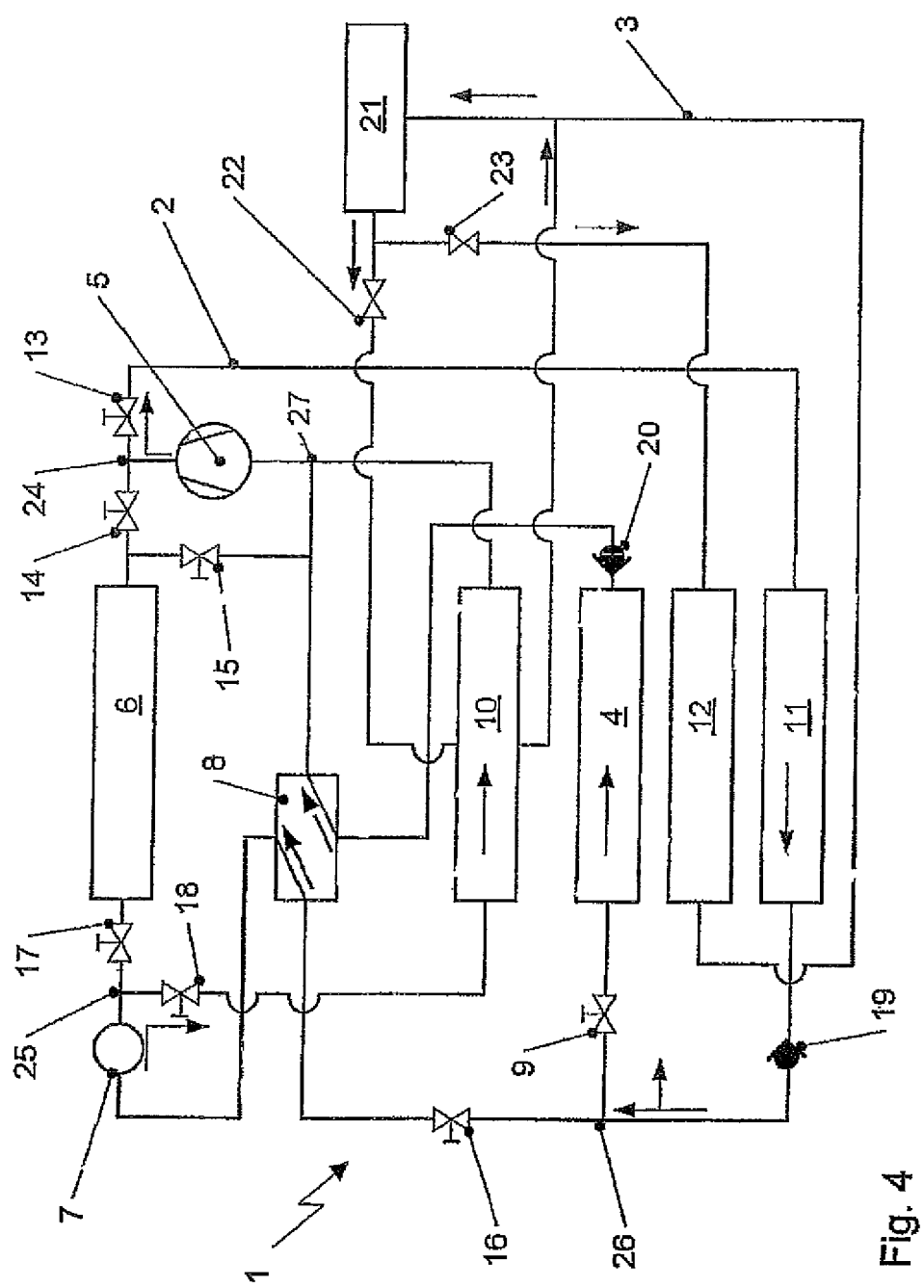
FIG. 4 illustrates an air conditioning system with the refrigerant circuit in the mode for dehumidifying and reheating the air with additional heat uptake from the motor cooling circuit.

In FIG. 4, the air conditioning system 1 with the refrigerant circuit 2 is represented in the mode for dehumidifying and reheating the air with additional heat uptake from the motor cooling circuit 3. The refrigerant mass flow compressed in the compressor 5 to a high pressure is led by means of the opened cutoff valve 13 and of the closed cutoff valve 14 exclusively through the heat register 11. The refrigerant thus releases all the supplied power as heat to the air to be supplied to the passenger space.

At the outlet of the heat register 11, the refrigerant mass flow is split into two partial mass flows by the evaporators 4, 10. In the evaporator 4, the refrigerant absorbs heat from the air to be supplied to the passenger space and/or dehumidifies the air. In the evaporator 10, heat from the motor cooling circuit 3 is supplied to the refrigerant.

The partial mass flows of the refrigerant are combined again before entering the compressor 5. The heat to be released to the air to be supplied to the passenger space is consequently composed of the combined powers at the compressor 5 and the evaporators 4, 10.

The inner heat exchanger 8 is active, and it is exposed on both sides to the refrigerant, wherein the partial mass flow is cooled further or supercooled by the evaporator 10 configured as refrigerant-coolant heat exchanger, and the partial mass flow is superheated by the evaporator 4 after the evaporation. The inner heat exchanger 8 is operated here in the co-current mode.

In the motor cooling circuit 3, the coolant, with the cutoff valve 22 opened, is circulated between the motor 21 and the evaporator 10. If, in addition to the cutoff valve 22, the cutoff valve 23 is also opened, the coolant flows alternatively in parallel both through the evaporator 10 and also through the heating exchanger 12, so that the heat released at the motor 21 is transferred both to the refrigerant and also directly to the air to be supplied to the passenger space.

In the switching positions of the air conditioning system 1 represented in the different operating modes according to FIGS. 1-4, the air mass flow to be supplied to the passenger space can be heated both as it flows over the heat exchanger surface of the heating exchanger 12 of the motor cooling circuit 3 and also as it flows over the heat exchanger surface of the heat register 11 of the refrigerant circuit 2.

When using a high-power heat register as heat register 11 having a base area similar to that of a PTC heater, that is an electrically operated resistance heater, and an installation depth of 12 mm, a heat of up to 7 kW can be transferred, so that it is optionally also possible to omit the heating exchanger 12 such that the air conditioning system 1 can also be designed without the heating exchanger 12. The heat register 11 can have an installation depth of up to 25 mm.

Due to the low installation depth of the heat register 11 of 12 mm, it is possible for temperature layering to occur. To avoid such temperature layering, the parallel operation of the heating exchanger 12 and heat register 11 is preferred, wherein the heating exchanger 12 is designed to be smaller in terms of its heat exchange area and thus in terms of its dimensions, than in the case of sole operation. The area of through-flow and the depth of the heating exchanger 12 are smaller, that is the depth is less than 35 mm, for example. The heat register 11 and the heat exchanger 12 are adjusted optimally with respect to each other in terms of their powers and dimensions. A combination of a heating exchanger 12 and a heat register 11 with an installation depth of up to 30 mm or of up to 25 mm, respectively, results in an overall installation depth of the heating exchange 12 and the heat register 11 of up to 55 mm, but preferably up to 45 mm, and in a manner optimized for a specific vehicle up to 30 mm.

The heating exchanger 12 is used as a preheater of the air mass flow for the heat register 11. The heat register 11 and the heating exchanger 12 are operated simultaneously, wherein the air mass flow is applied successively to the heat register 11 and the heating exchanger 12. As a result, the high-pressure increase in the refrigerant circuit 2 is supported, and the homogenization of the air temperature distribution is improved.

The heat register 11 is adjusted in terms of its size to the respective power, wherein as little supercooling of the refrigerant as possible is ensured at the outlet of the heat register 11. With regard to the displacement of the refrigerant and the setting of the inner volume with respect to the safety of the air conditioning system 1, the design has substantial advantages and, in the case of considerably smaller inner volumes compared to conventional heat registers, it ensures an overall lower filling quantity during operation in the heat pump mode than the heat exchanger 6 as condenser during operation in the chiller mode.

Figure 5:
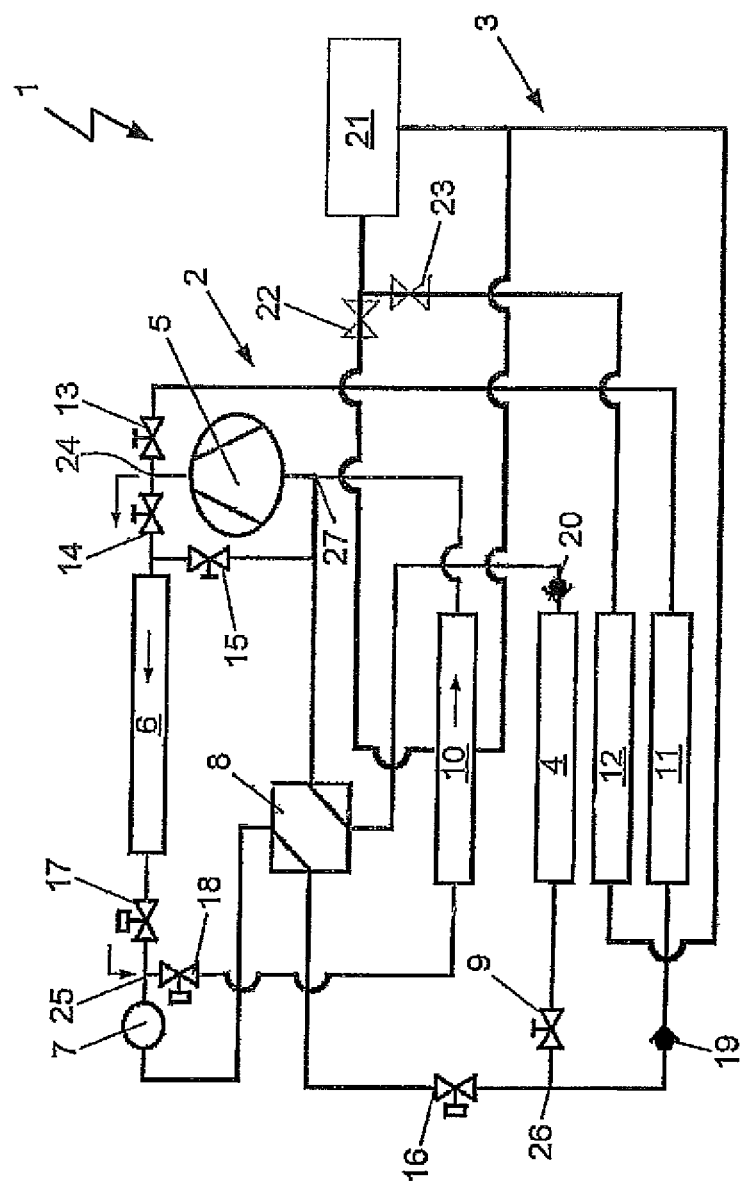
FIG. 5 illustrates an air conditioning system with the refrigerant circuit in the defrosting mode.

FIG. 5 shows the air conditioning systems 1 with the refrigerant circuit 2 and the motor cooling circuit 3 in the defrosting mode. Here, the heat exchanger 6 which was previously operated as an evaporator is defrosted or de-iced. The refrigerant exiting the compressor 5 at high pressure and at high temperatures, in the case of the opened cutoff valve 14 and closed cutoff valve 13, is conveyed through the heat exchanger 6. In the case of heat release from the refrigerant, the heat exchange area of the heat exchanger 6, which is now operated as a condenser/gas cooler, is de-iced.

After the coolant undergoes a pressure reduction in the expansion valve 18, the refrigerant in the evaporator 10 absorbs heat from the motor cooling circuit 3, and it is suctioned by the compressor 5. In the motor cooling circuit 3, the coolant is circulated between the motor 21 and the evaporator 10 with the cutoff valve 22 opened.

The valves 9, 16, 17, 18 can also be designed as fixed throttle valves, depending on the operating mode.

The receiver 7, which is arranged in the indicated embodiments in the high-pressure region of the refrigerant circuit 2, can alternatively also be arranged as an accumulator on the low-pressure side in the flow direction of the refrigerant after the evaporator 4.

The heat exchanger 6 can alternatively also be designed as a condenser which is exposed to water.

In FIGS. 6 and 7, optimal arrangements of the refrigerant circuit 2 of the air conditioning system 1 from FIGS. 1-5 in a vehicle are represented. In the arrangement of the components, in a front area 29, a wheel case 30, a radiator tank 31, and an air conditioning apparatus 32 can be seen. In the arrangement according to FIG. 6, the valves 13, 14, 15, 17, the receiver 7, and the branch 24 are accommodated in the wheel case 30, and the heat exchanger 6 is accommodated in the front area 29 of the motor vehicle. The heat exchanger 10, the valves 9, 16, 18, 28, the cutoff valve 19, the branches 25, 26 as well as the opening 27 are arranged in the radiator tank 31, and thus in the immediate vicinity of the air conditioning apparatus 32 with the heat exchangers 4, 11, 12. The remaining components of the refrigerant circuit 2 are located in the motor or engine space of the motor vehicle.

In FIG. 7, in addition to the mentioned arrangement according to FIG. 6, the inner heat exchanger 8, the heat exchanger 10 with the upstream valve 18 as well as the branch 25 are also arranged in the wheel ease 30. In the radiator tank 31, the valves 9, 16, 28 as well as the cutoff valves 19 are arranged, and the heat exchangers 4, 11, 12 are arranged in the air conditioning apparatus 32.

From the optimized pipeline guide in FIGS. 6 and 7, different operating modes with active or inactive inner heat exchanger 8 result.

The essential difference compared to the design of the refrigerant circuit 2 according to FIGS. 6 and 7 in regard to FIGS. 1-5 involves the incorporation of the heat exchangers 8 and 10. According to the embodiment in FIG. 2, showing the heat pump mode with coolant of the motor cooling circuit as heat source, or FIG. 4, showing the mode for dehumidifying and reheating the air with additional heat uptake from the motor cooling circuit 3, the refrigerant flows from the valve 16 at high pressure level further on through the inner heat exchanger 8, and subsequently via the expansion valve 18 into the heat exchanger 10. The exit of the heat exchanger 10 is connected directly to the inlet into the compressor 5.

In the refrigerant circuit 2 according to FIG. 6, in contrast, the heat exchanger 10 is incorporated in such a manner that the refrigerant, according to the mentioned operating modes, flows, after the valve 16, directly via the expansion valve 18 into the heat exchanger 10, without being applied to the inner heat exchanger 8. The exit of the heat exchanger 10 is, however, arranged before the inlet into the inner heat exchanger 8, so that the refrigerant flows on the low-pressure side through the inner heat exchanger 8.

The inner heat exchanger 8, in the heat pump modes according to FIG. 2 as well as in the mode for dehumidifying and reheating the air according to FIG. 4, remains inactive both in the design according to FIGS. 2 and 4 and also according to FIG. 6.

The cutoff valves 22, 23 of the motor cooling circuit 3 are combined and configured as a three-way valve 28.

FIG. 7 shows the air conditioning system 1 with a modified refrigerant circuit 2 as an arrangement in the motor vehicle with an active inner heat exchanger 8 in the heat pump modes according to FIG. 2 as well as in the mode for dehumidifying and reheating the air according to FIG. 4. The essential difference with respect to the design of the refrigerant circuit 2 according to FIGS. 1-6 is again the incorporation of the heat exchangers 8 and 10.

The comparison of the refrigerant circuit 2 according to FIGS. 1-5, 6 and 7 shows the air conditioning systems 1 with and without active operation of the inner heat exchanger 8 in the heat pump modes and in the mode for dehumidifying and reheating the air without additional switching elements, wherein the inner heat exchanger 8 in the chiller mode is always in operation. The activation of the inner heat exchanger 8 is here dependent only on the mutual arrangement of the circuit components.

According to the embodiment in FIGS. 1-5, the outlet from the heat exchanger 10 is connected directly to the inlet into the compressor 5 via the opening 27. Similarly, the third secondary flow path connects the inlet of the heat exchanger 6 to the inlet of the compressor 4, wherein, as the inlet of the heat exchanger 6, the flow direction of the refrigerant in the chiller mode is to be taken as the basis. The refrigerant exiting the heat exchanger 10 or the heat exchanger 6 does not flow through the inner heat exchanger 8.

According to the embodiment of FIG. 7, the outlet from the heat exchanger 10 through the opening 27 is, however, connected to the inlet of the inner heat exchanger 8. Similarly, the third secondary flow path connects the inlet of the heat exchanger 6 to the inlet of the inner heat exchanger 8. The refrigerant exiting the heat exchanger 10 or the heat exchanger 6 here flows in each case through the inner heat exchanger 8.

The inner heat exchanger 8 is thus active both in the heat pump modes similarly to FIG. 2 and also in the mode for dehumidifying and reheating the air similarly to FIG. 4, and it is operated in each case in co-current mode, while the inner heat exchanger 8 in the chiller mode is exposed to refrigerant in the counter-current mode. According to alternative embodiments, the inner heat exchanger 8 is also operated in the counter-current mode in the heat pump modes as well as in the mode for dehumidifying and reheating the air.

The displayed switching variants and operating modes can be used for any refrigerant which, on the low-pressure side, undergoes a phase transition from liquid to gaseous. On the high-pressure side, the medium releases the absorbed heat to a heat sink, by gas cooling, condensation and supercooling. Suitable refrigerants that can be used for this purpose are natural substances, such as, for example, R744, R717, etc., combustible R290, R600, R600a, etc., as well as chemical substances, such as R134a, R152a, HFO-1234yf, etc., or various refrigerant mixtures.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE SYMBOLS

1 Air conditioning system
2 Refrigerant circuit
3 Motor Cooling Circuit, Engine Cooling Circuit
4 Evaporator
5 Compressor
6 Heat exchanger
7 Receiver
8 Inner heat exchanger
9 Valve
10 Heat exchanger, evaporator
11 Heat exchanger, heat register
12 Heat exchanger, heating exchanger
13 Valve, cutoff valve
14 Valve, cutoff valve
15 Valve, cutoff valve
16 Valve, expansion device, expansion valve
17 Valve, expansion valve
18 Valve, expansion device, expansion valve
19 Cutoff valve
20 Cutoff valve
21 Motor or Engine
22 Valve, cutoff valve
23 Valve, cutoff valve
24 Branch
25 Branch
26 Branch
27 Opening
28 Valve, three-way valve
29 Front area
30 Wheel case
31 Radiator tank
32 Air conditioning apparatus

What is claimed is:

1. An air conditioning system for a vehicle comprising:
a refrigerant circuit configured for operating in at least a heating mode and cooling mode comprising:
a compressor;
a first refrigerant circuit heat exchanger in fluid communication with the compressor and configured for heat exchange between a refrigerant and an environment;
a second refrigerant circuit heat exchanger in fluid communication with the compressor and configured for supplying heat to an air supply to be conditioned for the vehicle;
a first branch disposed downstream of the compressor with respect to a flow direction of the refrigerant in the refrigerant circuit;
a first valve disposed intermediate the first branch and the second refrigerant circuit heat exchanger and in fluid communication with the compressor and the second refrigerant circuit heat exchanger;
a second valve disposed intermediate the first branch and the first refrigerant circuit heat exchanger and in fluid communication with the compressor and the first refrigerant circuit heat exchanger;
a receiver and a first expansion valve in fluid communication with the first refrigerant circuit heat exchanger;
an evaporator in fluid communication with the first refrigerant circuit heat exchanger and the second refrigerant circuit heat exchanger, wherein the first refrigerant circuit heat exchanger is disposed intermediate the second valve of the refrigerant circuit and the receiver, the receiver is disposed intermediate the first refrigerant circuit heat exchanger and the first expansion valve, the evaporator is disposed intermediate the first expansion valve and the compressor, and the second refrigerant circuit heat exchanger is disposed intermediate the first valve of the refrigerant circuit and the evaporator; and an inner heat exchanger disposed intermediate the first branch and the evaporator with respect to the flow direction of the refrigerant in the refrigerant circuit, wherein the refrigerant flows through the inner heat exchanger in a first mode and the refrigerant bypasses the inner heat exchanger in a second mode; and a motor cooling circuit in heat transfer communication with the refrigerant circuit, wherein the motor cooling circuit further comprises:

a first flow path of a coolant, the first flow path having a motor in fluid communication with a first motor cooling circuit heat exchanger; and a second flow path of the coolant, the second flow path having a second motor cooling circuit heat exchanger in fluid communication with the motor, wherein the first motor cooling circuit heat exchanger is in fluid communication with the refrigerant circuit and a coolant circuit valve controls a flow of the coolant through each of the first flow path and the second flow path of the coolant, and wherein the first motor cooling circuit heat exchanger is disposed in a secondary flow path of the refrigerant circuit, the secondary flow path extending from a second branch disposed intermediate the receiver and the first expansion valve of the refrigerant circuit to an opening disposed intermediate the compressor and the evaporator, wherein the secondary flow path bypasses the inner heat exchanger.

2. The air conditioning system of claim 1, wherein the secondary flow path includes a second expansion valve disposed intermediate the second branch and the first motor cooling circuit heat exchanger.

3. The air conditioning system of claim 1, wherein the refrigerant circuit further includes a second expansion valve disposed intermediate the first refrigerant circuit heat exchanger and the receiver.

4. The air conditioning system of claim 1, wherein the evaporator is disposed in a section of the refrigerant circuit extending from a third branch disposed intermediate the first expansion valve and the second refrigerant circuit heat exchanger to the opening, the section including an evaporator valve disposed intermediate the third branch and the evaporator, the evaporator valve having a normally open characteristic.

5. The air conditioning system of claim 1, wherein each of the first valve and the second valve of the refrigerant circuit are configured as a 2-2-way valve.

6. The air conditioning system of claim 1, wherein the refrigerant circuit further includes a tertiary flow path having a third valve, the tertiary flow path extending from a first point disposed intermediate the second valve and the first refrigerant circuit heat exchanger to a second point disposed upstream of an inlet of the compressor.

7. The air conditioning system of claim 1, wherein a cutoff valve is disposed intermediate the second refrigerant circuit heat exchanger and the inner heat exchanger.

8. The air conditioning system of claim 1, wherein the first valve of the refrigerant circuit has a normally open characteristic and the second valve of the refrigerant circuit has a normally closed characteristic.

9. The air conditioning system of claim 1, wherein the second refrigerant circuit heat exchanger has a depth in the range of 10 mm to 20 mm and the second motor cooling circuit heat exchanger has a depth in the range of 30 mm to 55 mm.

10. The air conditioning system of claim 1, wherein the first refrigerant circuit heat exchanger is disposed in a front area of the vehicle, the first valve of the refrigerant circuit and the second valve of the refrigerant circuit are disposed in a wheel case area of the vehicle, and the second refrigerant circuit heat exchanger and the first motor cooling circuit heat exchanger are disposed in an air conditioning apparatus.

11. The air conditioning system of claim 1, wherein the first motor cooling circuit heat exchanger is disposed in a radiator area.

* * * * *